(12) United States Patent
Cho (10) Patent No.: US 9,972,996 B2
(45) Date of Patent: May 15, 2018

(54) STEERING WHEEL HAVING A HEATING ELEMENT, AND FAIL-SAFETY DEVICE USING THE SAME

(71) Applicant: Hwajin Co., Ltd., Gyeongsangbuk-do (KR)

(72) Inventor: Man Ho Cho, Gyeonggi-do (KR)

(73) Assignee: Hwajin Co., Ltd., Gyeongsangbuk-do (KR)

( * ) Notice: Subject to any disclaimer, the term of this patent is extended or adjusted under 35 U.S.C. 154(b) by 360 days.

(21) Appl. No.: 14/507,527

(22) Filed: Oct. 6, 2014

(65) Prior Publication Data

US 2015/0021309 A1  Jan. 22, 2015

Related U.S. Application Data

(63) Continuation of application No. PCT/KR2013/002876, filed on Apr. 5, 2013.

(30) Foreign Application Priority Data

Apr. 6, 2012  (KR) .................. 10-2012-0036280
Apr. 4, 2013  (KR) .................. 10-2013-0036995

(51) Int. Cl.
*B62D 1/06* (2006.01)
*H02H 7/20* (2006.01)
(Continued)

(52) U.S. Cl.
CPC ............... *H02H 7/20* (2013.01); *B62D 1/065* (2013.01); *H05B 3/14* (2013.01); *H05B 3/34* (2013.01); *H05B 2203/007* (2013.01)

(58) Field of Classification Search
CPC ..... H02H 7/20; B62D 1/065; H05B 2203/007
(Continued)

(56) References Cited

U.S. PATENT DOCUMENTS 3,573,430 A * 4/1971 Eisler ................. B65D 81/3476
219/385
5,471,034 A * 11/1995 Kawate ................ B60H 1/2225
219/483
(Continued)

FOREIGN PATENT DOCUMENTS

CN 2142091 Y 9/1993
CN 2679001 Y 2/2005
(Continued)

OTHER PUBLICATIONS

Korean Office Action of counterpart Korean Application No. 10-2013-0036995 and full English translation thereof.
(Continued)

*Primary Examiner* — David Angwin
*Assistant Examiner* — John J Norton
(74) *Attorney, Agent, or Firm* — Brinks Gilson & Lione (57) ABSTRACT

The present invention relates to a steering wheel having a heating element and a fail-safety device using the same. The steering wheel having a heating element has a rim, a surface of which is coated with an electrically conductive heating element. The heating element includes a plurality of unit heating elements arranged in parallel, each of which includes a first unit line, each of two ends of which connect a positive power-applying terminal and a negative power-applying terminal together in series; a second unit line spaced apart from the first unit line, each of two ends of which connects the positive power-applying terminal and the negative power-applying terminal together in series; and a connection line for connecting the first and second unit lines.

4 Claims, 9 Drawing Sheets

(51) Int. Cl.
*H05B 3/14* (2006.01)
*H05B 3/34* (2006.01)

(58) Field of Classification Search
USPC .......................................................... 219/204
See application file for complete search history.

(56) References Cited

U.S. PATENT DOCUMENTS

| | | | | | |
|---|---|---|---|---|---|
| 5,847,360 | A * | 12/1998 | Lorenzen | ............... | B62D 1/065 219/204 |
| 6,078,025 | A * | 6/2000 | Yeung | .................... | H05B 3/342 219/211 |
| 6,093,908 | A * | 7/2000 | Haag | ...................... | B62D 1/065 219/204 |
| 6,664,517 | B2 * | 12/2003 | Nagatomo | ........... | H05B 1/0236 219/204 |
| 6,770,854 | B1 * | 8/2004 | Keane | .................... | H05B 3/342 219/212 |
| 2001/0030182 | A1 * | 10/2001 | Haag | ...................... | B62D 1/065 219/204 |
| 2003/0183620 | A1 * | 10/2003 | Wong | ...................... | H05B 3/34 219/549 |
| 2004/0040946 | A1 * | 3/2004 | Nation | ................. | B60N 2/5685 219/217 |
| 2009/0121824 | A1 * | 5/2009 | Feuerstein | ............ | F24H 3/0405 338/22 R |
| 2010/0270279 | A1 * | 10/2010 | Kapp | ...................... | H05B 3/34 219/202 |

FOREIGN PATENT DOCUMENTS

| | | |
|---|---|---|
| JP | S61218475 A | 9/1986 |
| JP | 2008-232503 A | 10/2001 |
| JP | 2003-019964 | 1/2003 |
| JP | 2005297704 A | 10/2005 |
| JP | 2010-215140 | 9/2010 |
| JP | 2011-018494 | 1/2011 |
| JP | 2011-121477 | 6/2011 |
| JP | 2013-542875 | 11/2013 |
| KR | 20-1991-0011426 | 7/1991 |
| KR | 10-1992-0019598 | 11/1992 |
| KR | 20-1998-002418 | 3/1998 |
| KR | 20-0331802 | 10/2003 |
| KR | 10-2004-0090311 A | 10/2004 |
| KR | 10-0816405 | 3/2008 |
| KR | 20-2009-0006149 | 6/2009 |
| KR | 10-1031630 | 4/2011 |
| KR | 10-1048814 | 7/2011 |
| KR | 10-1048814 B1 | 7/2011 |
| KR | 1020110081757 A | 7/2011 |
| WO | WO 2011/105765 A2 | 9/2011 |

OTHER PUBLICATIONS

International Search Report and Written Opinion for International Patent No. PCT/KR2013/002876, dated Jun. 1, 2013.

\* cited by examiner

FIG. 1

PRIOR ART

FIG. 2

PRIOR ART

FIG. 3

PRIOR ART

FIG. 4

PRIOR ART

FIG. 5

PRIOR ART

FIG. 6

PRIOR ART

FIG. 7

PRIOR ART

STEERING WHEEL HAVING A HEATING ELEMENT, AND FAIL-SAFETY DEVICE USING THE SAME

PRIORITY

This application is a continuation of Patent Cooperation Treaty (PCT) international application Serial No. PCT/KR2013/002876, filed on Apr. 5, 2013 and which designates the United States, which claims priority to Korean Patent Application No. 10-2012-0036280, filed on Apr. 6, 2012, and Korean Patent Application No. 10-2013-0036995, filed on Apr. 4, 2013. The entirety of both Patent Cooperation Treaty (PCT) international application Serial No. PCT/KR2013/002876 and Korean Patent Application Nos. 10-2012-0036280 and 10-2013-0036995 are hereby incorporated by reference herein.

BACKGROUND OF THE INVENTION

Technical Field

The present invention relates to a steering wheel having a heating element and a fail-safety device using the steering wheel, in which even when an open circuit occurs in a portion of a heating element coated on the entire surface of a rim for warm holding in winter, the heat emission performance of the rim does not degrade, and if a resistance of the heating element increases over a predetermined value due to damage of the heating element, over-heating is prevented.

Related Art

A rim of a steering wheel, which is an element of a steering wheel, is held at all times and manipulated by a driver, and has been researched and developed in various aspects such as elegance of an exterior, convenience in holding, and adoption of functional elements.

In particular, at an initial stage of driving in winter, the temperature of the rim of the steering wheel is lower than that of the human body, inconveniencing the driver when holding the rim and accordingly, making driving unsafe.

In line with this, various devices have been developed to heat the rim of the steering wheel over a higher temperature than that of the human body.

Figure 1:
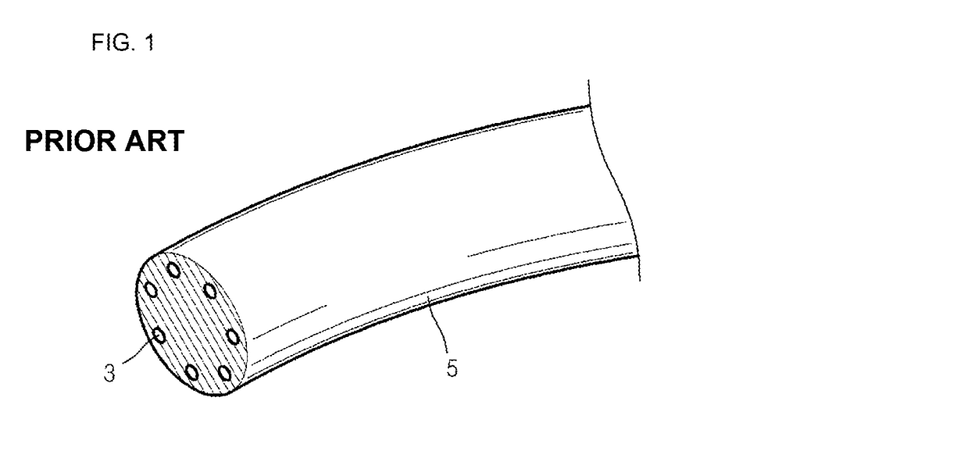
FIGS. 1 and 2 are schematic diagrams illustrating a steering wheel having a conventional heating line.

As examples of techniques for heating the rim of the steering wheel, Korean Utility Model Application No. 1989-0020599, Korean Patent Application No. 1992-0000945, and Korean Utility Model Application No. 1996-0016958 disclose a steering wheel rim structure (see FIG. 1) in which a heating line 3 is buried in a rim 5 of a steering wheel.

Figure 2:
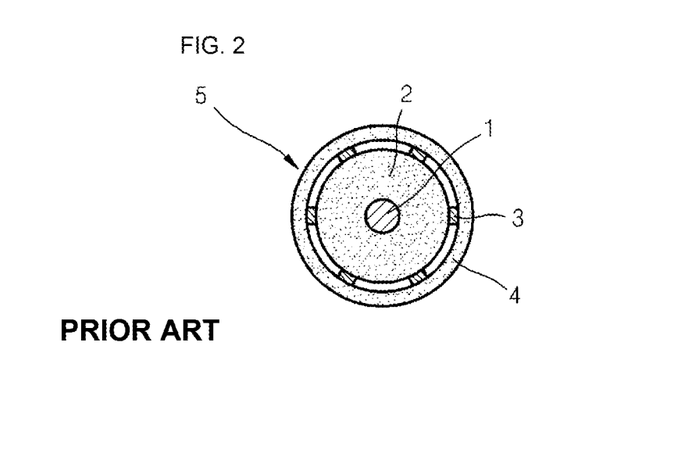

As a way to lay the heating line 3, as illustrated in FIG. 2, an insulating coating material 2 is coated onto an outer side of a core 1, and the heating line 3 is adhered to an outer circumferential surface of the insulating coating material 2 and finished with a finishing member 4 such as a synthetic resin material.

Figure 3:
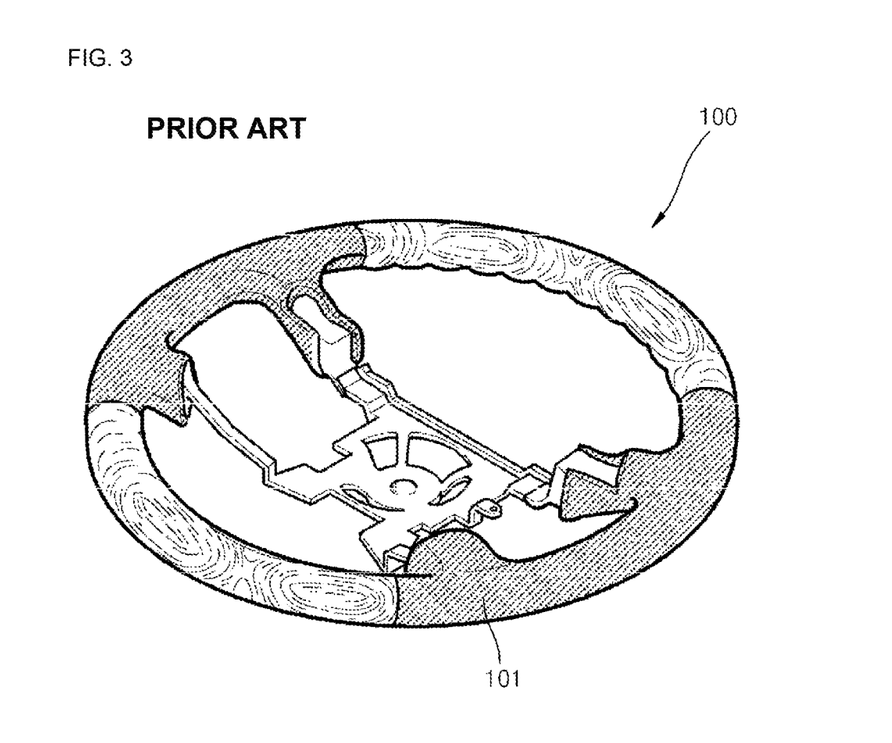
FIGS. 3 and 4 are schematic diagrams illustrating a conventional steering wheel in which there are difficulties in selecting a heating line.

However, as illustrated in FIG. 3, for a steering wheel 100 using a sophisticated decorating element such as leather 101, it is difficult to adopt a heating line as a heating element.

Figure 4:
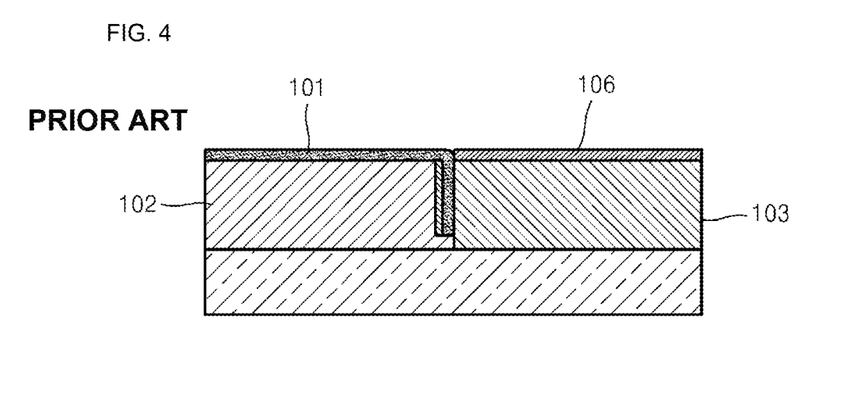

As illustrated in FIG. 4, for a sophisticated steering wheel, a certain section of the steering wheel is formed of foaming urethane 102 (a first molding) and is finished by being wrapped by natural leather 101 (wrapping of natural leather 101), and the other section is softened with ABS or soft urethane 103 (a second molding) and is applied various patterns 106 such as a tree pattern, a hair line, a marble pattern, and the like through liquid pressure transfer.

Figure 5:
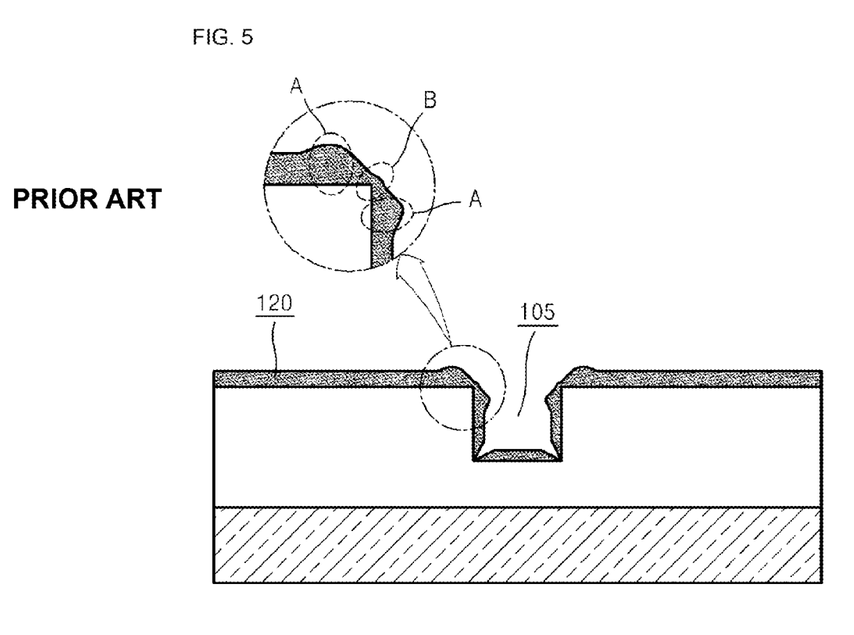
FIG. 5 is a schematic diagram for describing a problem when conductive paint is coated using a spraying method.

As illustrated in FIG. 5, instead of burying a heating line in a rim, conductive paint, which is a heating element, is coated onto a surface of a steering wheel by using a spraying method, and then is dried to make a heating element. In this case, however, some problems occur in a treated groove 105 due to a spray coating layer 120.

That is, the coating layer 120 becomes thick (as indicated by A) due to the congestion of the conductive paint, caused by a surface tensile force at an edge portion of the treated groove 105, or the conductive paint becomes thin (as indicated by B) at an edge portion due to static electricity, disturbing the flow of electricity in the treated groove 105 and peeling the conductive paint during post-processing such as enclosing with leather, or the like.

When the coating layer 120 is formed in the treated groove 105 by using a spraying method, a bubble phenomenon occurs due to spraying, increasing an electrical conduction defective rate and making the thickness of coating layer be non-uniform.

Besides, the whole or partial an open circuit of a heating line circuit may occur in various portions for various reasons. Moreover, as partial damage occurs in a portion of a heating element, over-current flows in other portions where the damage does not occur, causing a local temperature increase that leads to fire.

SUMMARY OF THE INVENTION

The present invention provides a steering wheel having a heating element and a fail-safety device using the steering wheel, in which through improving a shape in which a heating element is coated, even when a damage occurs in a portion of the heating element, degradation in heat emission performance is prevented and over-heating caused by the damage of the heating element is prevented, and the damage is early detected to prevent fire.

The present invention also provides a steering wheel and a fail-safety device using the steering wheel, in which with a parallel-pattern configuration of a heating element, even when a damage occurs in a portion of the heating element, it is possible to prevent degradation in heat emission performance, to prevent over-heating caused by the damage of the portion of the heating element, and to prevent fire of a vehicle by easily detecting the damage in the heating element.

According to an aspect of the present disclosure, there is provided a steering wheel having a rim, a surface of which is coated with an electrically conductive heating element, in which the heating element includes a plurality of unit heating elements arranged in parallel, each of which includes a first unit line, each of two ends of which connect a positive power-applying terminal and a negative power-applying terminal together in series, a second unit line spaced apart from the first unit line, each of two ends of which connects the positive power-applying terminal and the negative power-applying terminal together in series, and a connection line for connecting the first and second unit lines.

According to other aspect of the present disclosure, a plurality of connection lines are provided and perpendicularly connect the first and second unit lines.

According to other aspect of the present disclosure, a plurality of connection lines are provided and include a first sub-connection line for connecting the first and second unit lines in a diagonal direction and a second sub-connection line for connecting the first and second unit lines in a diagonal direction, the second sub-connection line intersecting the first sub-connection line.

According to other aspect of the present disclosure, a plurality of connection lines are provided in the shape of circles, and the first and second unit lines contact the circles.

According to another aspect of the present disclosure, there is provided a fail-safety device for a steering wheel having a heating element, the fail-safety device including the steering wheel according to one of claims 1 to 4 and a microcomputer for controlling power applied to the heating element and sensing a resistance of the heating element, in which if the microcomputer senses that the resistance of the heating element exceeds a predetermined range due to damage of the heating element, the microcomputer cuts off power applied to the heating element or transmits a warning signal to a driver.

DETAILED DESCRIPTION OF THE INVENTION

Generally, to configure an electric circuit by using a common heating line, serial connection or parallel connection, in which multiple heating lines are coupled, may be used. However, for serial connection, if any portion of a heating line open circuits, the whole heating line open circuits, and thus the heating line fails to work. Thus, in most cases, a parallel circuit is used in which even if damage occurs in a portion, electricity is continuously provided for heat emission.

Heat emission of a steering wheel is made by an electric resistance of a heating line, and considering that voltage and current cannot be significantly changed in a vehicle, the resistance of the heating line is a major factor for determining heat emission.

A heating element used in the present disclosure is configured where electrically conductive ink is coated onto a surface of a rim and has physical property values that are quite different from those of a commonly used heating element, such as low strength, toughness, and anti-abrasion properties, so that the heating element may be easily open circuited by external shock.

If a portion of the heating element configured with the conductive ink is damaged, excessively large current flows in a non-damaged portion of the heating element, causing over-heating. Accordingly, such over-heating causes the local deformation of a rim portion formed of a petrochemical material such as polyurethane, and such deformation may accelerate the damage of the heating element.

Figure 14:
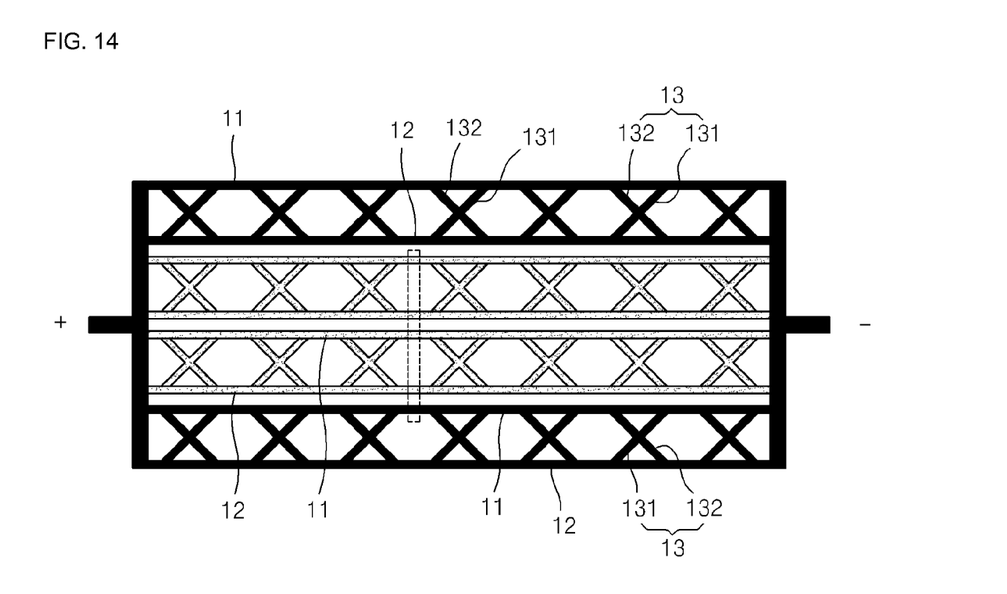

For example, if extreme damage occurs in a particular portion of a heating element, as illustrated in FIG. 14, fire may occur due to over-heating or generation of a spark, significantly threatening the safety of driving a vehicle.

Figure 6:
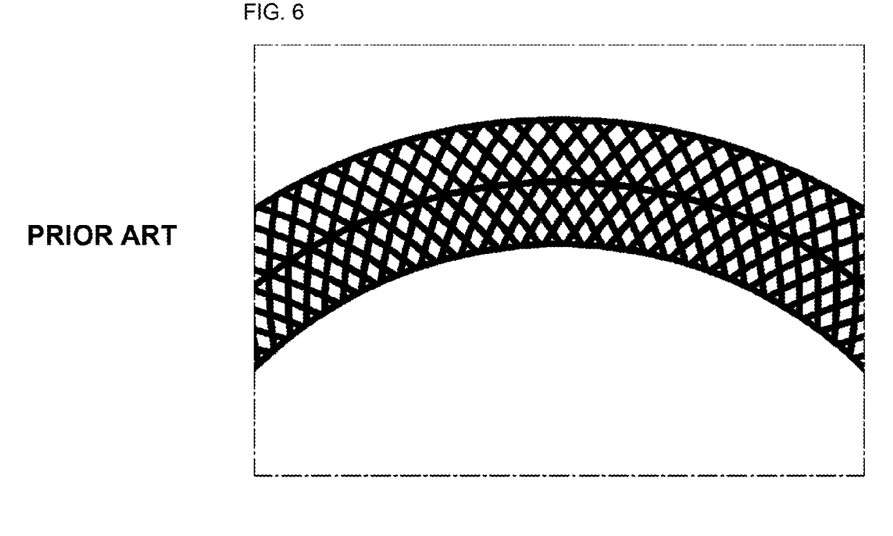
FIG. 6 is a diagram illustrating an example of a layout of a heating element of a steering wheel.
Figure 7:
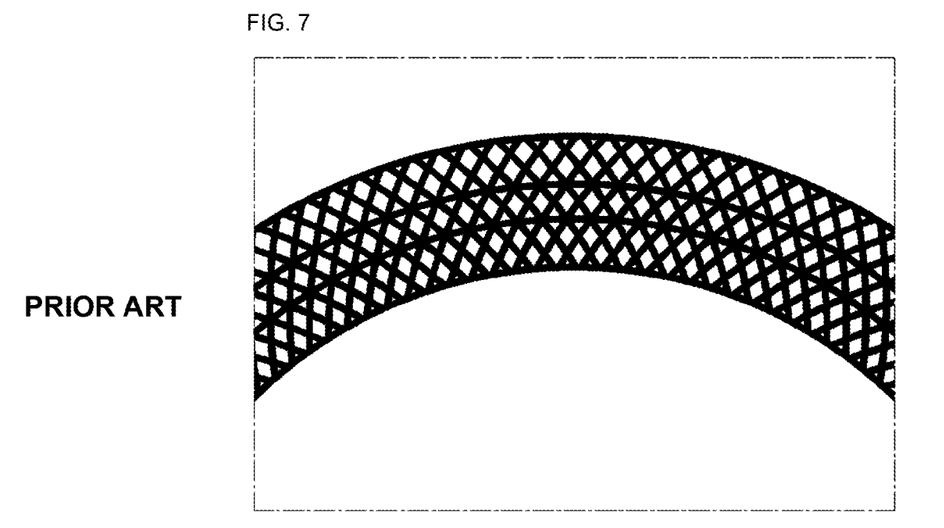
FIG. 7 is a diagram illustrating another example of a layout of a heating element of a steering wheel.

To prevent the degradation in a heat-emitting function, caused by an open circuit occurring in a portion of the heating element, a heating element is arranged using a parallel structure modified as illustrated in FIG. 6, and to reduce variations in heating emission and temperatures from position-to-position on the surface of the rim of the steering wheel, a heating element is arranged where the number or positions of heating elements may be adjusted, as illustrated in FIG. 7.

Figure 8:
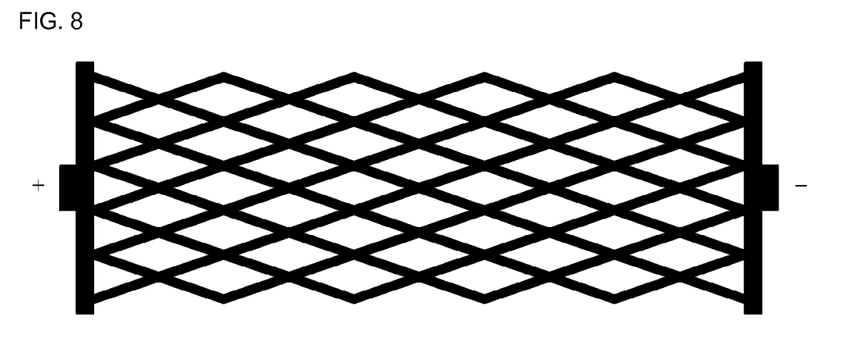
FIGS. 8 and 9 are diagrams illustrating examples of the shape of a heating element of a steering wheel for comparison with the present disclosure.

However, as illustrated in FIG. 8, which conceptually illustrates FIGS. 6 and 7, even when a portion of a heating element is damaged in a circuit of the heating element, a change in resistance is very small such that in light of a voltage change of a vehicle, except for significant damage, it is not easy to detect the damage of the heating element.

To prevent such a problem, it may be necessary to mount a temperature sensor for sensing a temperature or a device for sensing a resistance of a heating element for any portion of the steering wheel. However, it is practically difficult to mount the temperature sensor for any portion of the steering wheel and it is not practical or economical to mount the resistance sensor for sensing damage of a specific portion of the heating element.

By measuring a current and a voltage of a heating element through a microcomputer, the resistance of the heating element may be checked at predetermined time intervals. A voltage across Electric/Electronic Sub-Assemblies (ESA) under normal driving conditions of a vehicle is about 12V, but it may change from about 6V to about 24V according to circumstances, and a voltage across the steering wheel ranges from about 9V to about 16V. An allowable current of the steering wheel is 10 A, such that a resistance of the heating element changes from about 1Ω to about 2Ω.

Figure 9:
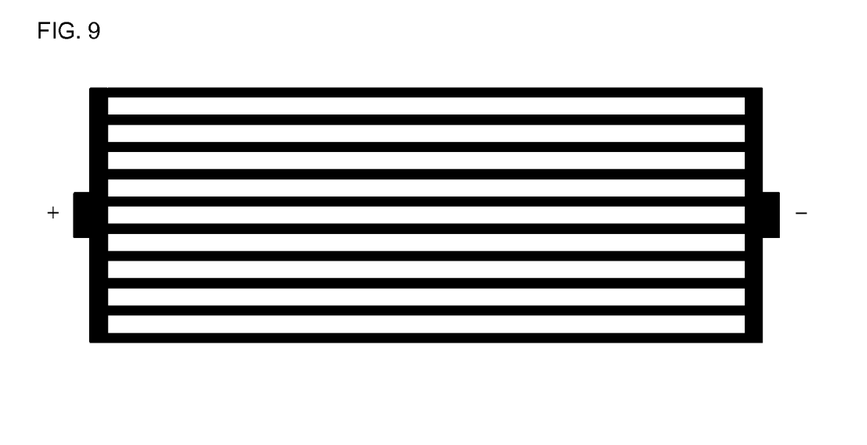

Hence, to easily detect a resistance change, the arrangement of a heating element, as illustrated in FIG. 9, may be considered, in which significant degradation in heat emission performance may be caused due to damage at a portion of a heating element and thus it may be difficult to apply the arrangement.

Therefore, to solve the foregoing and other problems, the present disclosure provides a steering wheel and a fail-safety device using the steering wheel, in which even if a portion of a heating element 20 is damaged, the heat emission performance of the steering wheel does not degrade, and if a resistance of the heating element 20 sharply increases due to severe damage of the heating element 20, such a circumstance is easily recognized and thus an accident like fire may be prevented.

Figure 10:
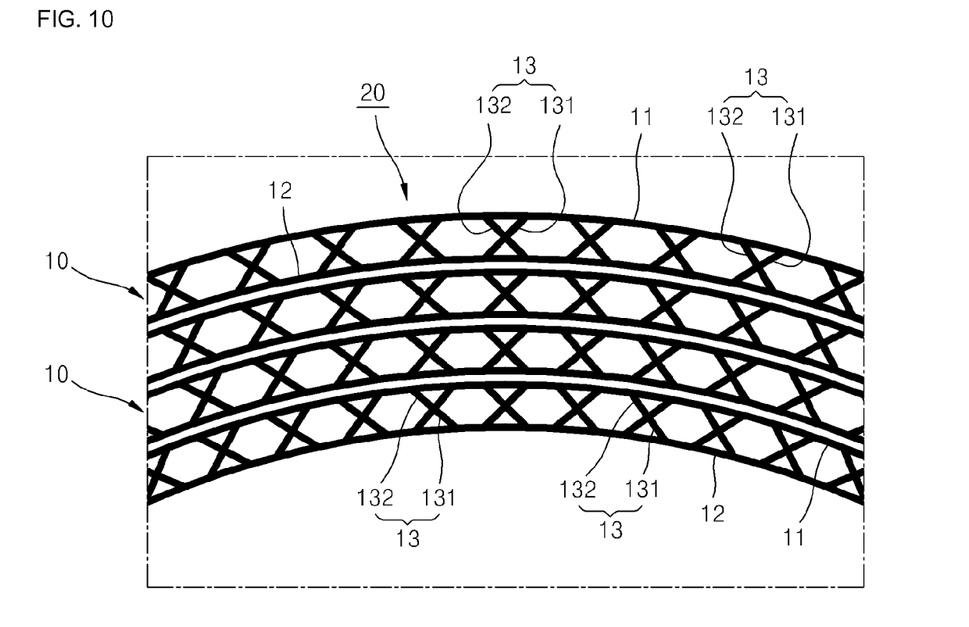
FIG. 10 is a diagram illustrating the shape of a heating element of a steering wheel, according to an embodiment of the present disclosure.
Figure 11:
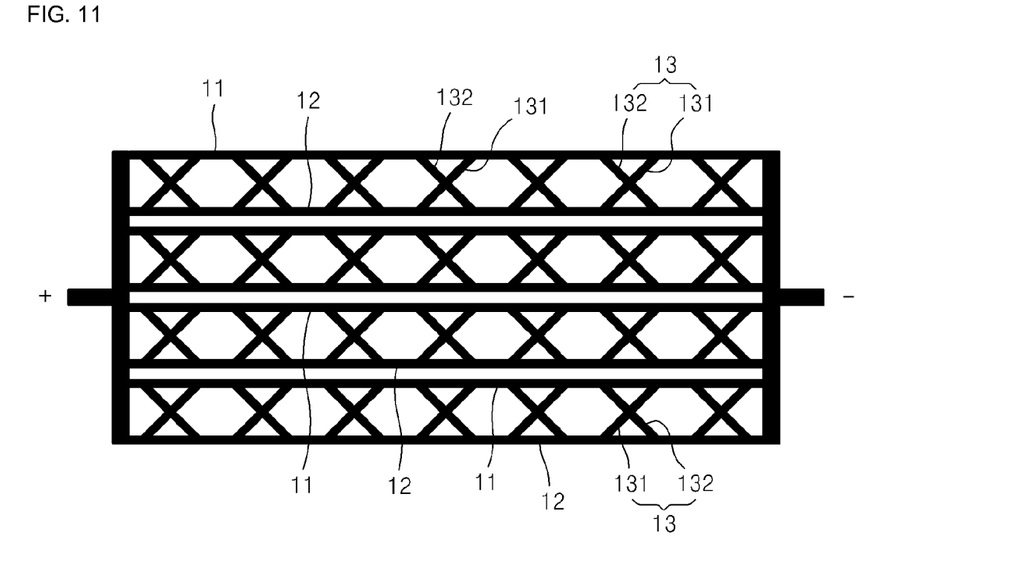
FIG. 11 is a conceptual diagram linearly illustrating the heating element of FIG. 10.

FIG. 10 is a diagram illustrating the shape of the heating element 20 of a steering wheel, according to an embodiment of the present disclosure, and FIG. 11 is a conceptual diagram linearly illustrating the heating element 20 of FIG. 10.

In a steering wheel having a heating element, according to the current embodiment in which an electrically conductive heating element is coated onto a surface of a rim, the heating element 20 is configured with a plurality of unit heating elements 10 arranged in parallel, each of which includes a first unit line 11, a second unit line 12, and a connection line 13.

Both end portions of the first unit line 11 serially connect a plus power-applying terminal (hereinafter, referred to as a "+ power-applying terminal") and a minus power-applying terminal (hereinafter, referred to as a "− power-applying terminal").

The second unit line 12 is spaced apart from the first unit line 11, such that both end portions of the second unit line 12 serially connect the + power-applying terminal and the − power-applying terminal.

The connection line 13 connects the first unit line 11 with the second unit line 12. According to the current embodiment, a plurality of connection lines 13 are provided. More specifically, the connection line 13 includes a first sub-connection line 131 for connecting the first unit line 11 with the second unit line 12 in a diagonal direction and a second sub-connection line 132 intersecting the first sub-connection line 131 to connect the first unit line 11 with the second unit line 12 in a diagonal direction. That is, one connection line 13 is in an "x" shape and the plurality of connection lines 13 connect the first unit line 11 with the second unit line 12.

As illustrated in FIG. 11, the unit heating element 10 serially connects the + power-applying terminal with the − power-applying terminal, and a plurality of unit heating elements 10 are connected in parallel to configure the heating element 20.

More specifically, the first unit line 11 and the second unit line 12 of the unit heating element 10 are connected in parallel by the connection line 13 to form one unit heating element 10. A plurality of such unit heating elements 10 are arranged in parallel.

Figure 12:
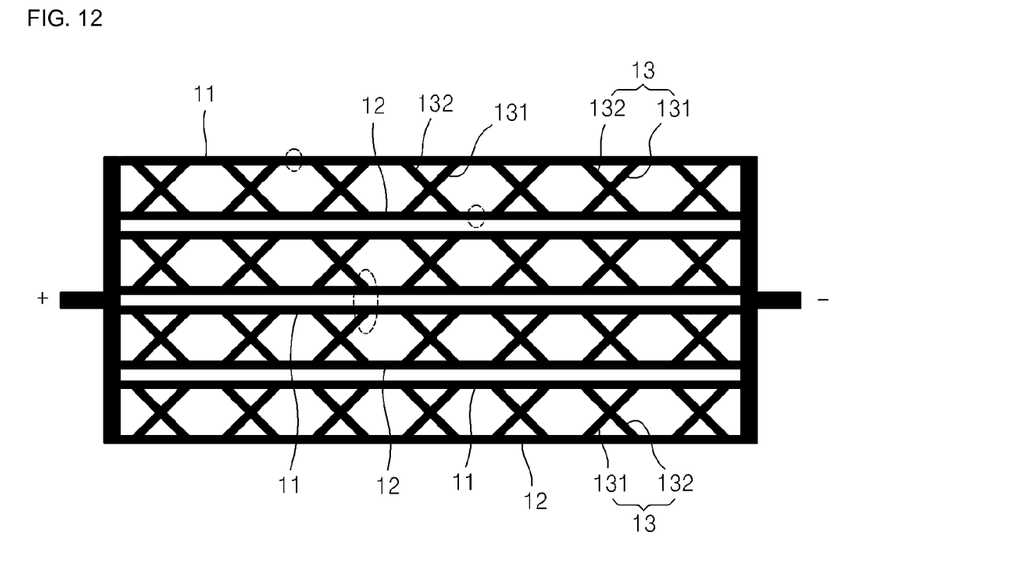
FIGS. 12 through 14 illustrate the flow of electricity if damage occurs in a portion of a heating element in FIG. 11.
Figure 13:
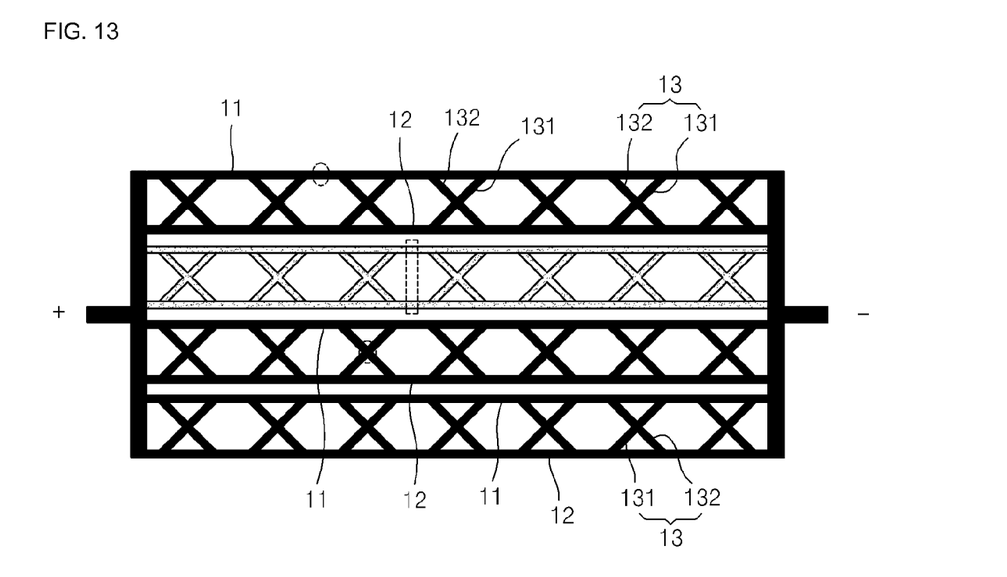

The operations and effects of the steering wheel having a heating element structured as described above will be described in detail. Referring to FIGS. 12 through 14, a description will be made of a change in heat emission performance, a change in the resistance of the heating element 20, and the possibility of over-heating in detail.

In FIG. 12, portions indicated by dashed lines mean portions that are open circuited due to damage of the heating element 20, and black lines of the heating element 20 indicate where the current flows in the heating element 20. As illustrated in FIGS. 13 and 14, empty lines of the heating element 20 indicate that the heating element 20 is damaged and thus the current does not flow in a portion corresponding to the empty lines.

Referring to FIG. 12, an open circuit occurs in a topmost portion of the first unit line 11 and a topmost portion of the second unit line 12 of the unit heating element 10 in FIG. 12, an open circuit occurs in a portion of the second unit line 12 of the unit heating element 10 that is disposed second from top, and an open circuit occurs in a portion of the first unit line 11 of the unit heating element 10 that is disposed third from top.

In this case, in the topmost unit heating element 10, the current flows from the + power-applying terminal to the − power-applying terminal through the connection line 13, in spite of an open circuit of the first unit line 11 and the second unit line 12.

Also, in the unit heating element 10 disposed second from top and the unit heating element 10 disposed third from top, the current flows from the + power-applying terminal to the − power-applying terminal through the connection line 13.

Therefore, the unit heating element 10 enables the heating element 20 to emit heat by allowing the current to flow with the first and second unit lines 11 and 12 disposed in parallel and the connection line 13 connecting the first and second unit lines 11 and 12 without degrading heat emission performance, even if damage occurs in a portion of the first unit line 11 or the second unit line 12.

That is, when a portion of the heating element 20 open circuits, there is not a big electrical issue in a circuit of the heating element 20, let alone a large resistance change sensed and a heat emission performance difference, such that an operation in a normal range is possible.

FIG. 13 illustrates a case where the unit heating element 10 disposed second from top causes a complete open circuit. In this case, a change in resistance and heat emission performance of about 25% occurs, such that an abnormal state is easily detected.

FIG. 14 illustrates a case where the unit heating element 10 disposed second from top and the unit heating element 10 disposed third from top cause complete open circuit. In this case, current does not flow in a portion corresponding to a half of the heating element 20 and current concentrates on the other portion of the heating element 20, such that a resistance changes by about 50% and the number of heating elements 20 that perform the heat-emitting function is reduced by about 50%. In this situation, there is a danger of the entire circuit being over-heated.

As illustrated in FIGS. 13 and 14, the unit heating elements 10 are arranged in parallel, such that if the unit heating element 10 is entirely damaged and thus cannot function at all, resistance and heat emission performance changes may be easily predicted. That is, if all the unit heating elements 10 are connected to one another, it may not be easy to sense a resistance change, but through parallel connection between the unit heating elements 10, the resistance change may be easily sensed.

Figure 15:
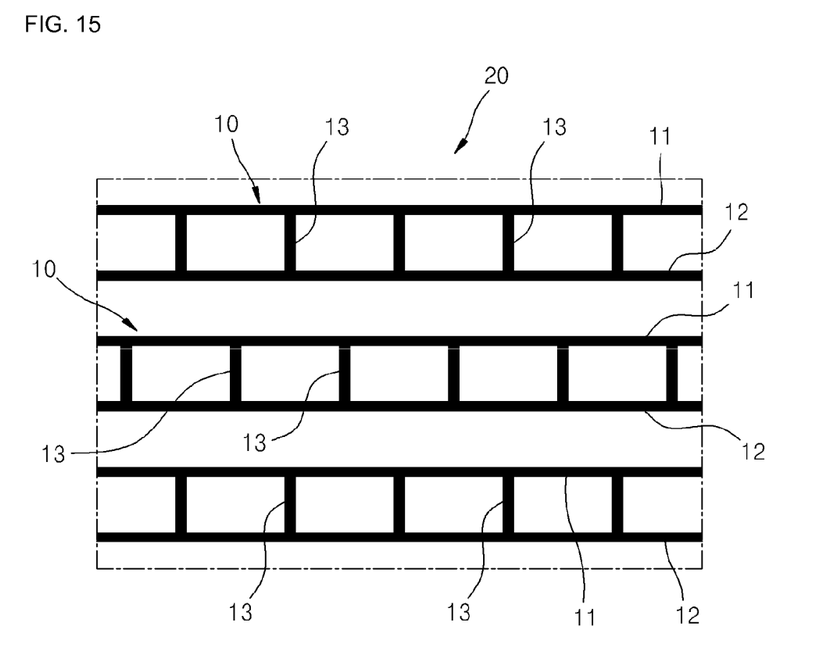
FIG. 15 is a diagram illustrating the shape of a heating element of a steering wheel according to another embodiment of the present disclosure.
Figure 16:
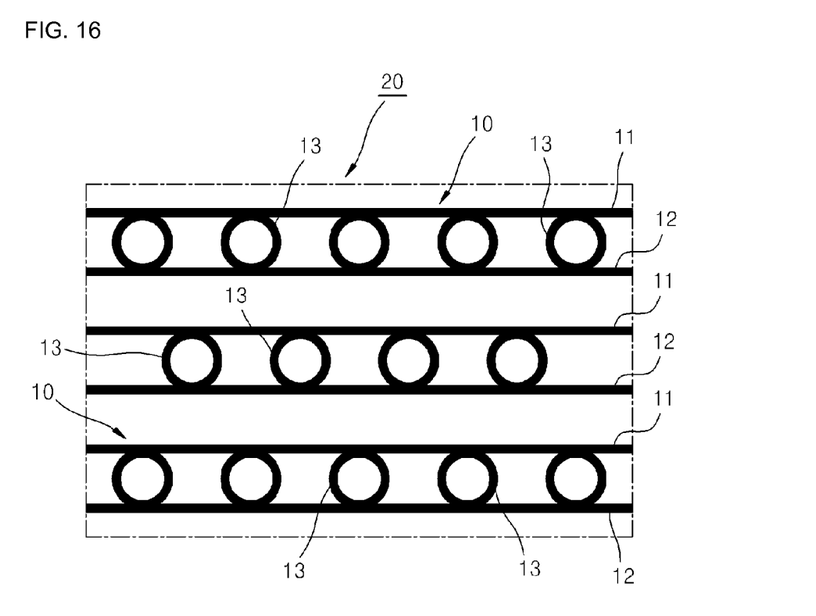
FIG. 16 is a diagram illustrating the shape of a heating element of a steering wheel according to another embodiment of the present disclosure.

FIG. 15 is a diagram illustrating the shape of the heating element 20 of a steering wheel, according to another embodiment of the present disclosure, and FIG. 16 is a diagram illustrating the shape of the heating element 20 of a steering wheel, according to another embodiment of the present disclosure. In FIGS. 15 and 16, elements that perform the same functions as in the embodiment of FIG. 11 will be given the same reference numerals as in FIG. 11 and will not be described again in detail.

The embodiments illustrated in FIGS. 15 and 16 are different from the embodiment illustrated in FIG. 11 in terms of the shape of a connection element. Referring to FIG. 15, a plurality of connection lines 13 are provided and connect the first unit line 11 and the second unit line 12 perpendicularly.

Referring to FIG. 16, a plurality of connection lines 13 are provided and have circular shapes, and the first unit line 11 and the second unit line 12 contact the circles.

Also in the embodiments illustrated in FIGS. 15 and 16, the first unit line 11 and the second unit line 12 of the unit heating element 10 are serially connected to the + power-applying terminal and the − power-applying terminal, and the first unit line 11 and the second unit line 12 are connected to each other by the connection line 13. Such unit heating elements 10 are connected in parallel, whereby if damage occurs in portions of the first unit line 11 and the second unit line 12, operation may be possible without degrading heat emission performance, and a resistance change may be easily recognized if the unit heating element 10 is entirely damaged.

According to another aspect of the present disclosure, a fail-safety device using a steering wheel having the above-described heating element is provided.

The fail-safety device according to the present disclosure includes a steering wheel having the above-described heating element and a microcomputer.

The microcomputer controls power applied to the heating element 20 and senses the resistance of the heating element 20. If the microcomputer senses that the resistance of the heating element 20 exceeds a predetermined range due to damage of the heating element 20, the microcomputer cuts off power that is applied to the heating element 20 or sends a warning signal to a driver.

The microcomputer used in the present disclosure may be a microcomputer separately provided for the device or may be integrated into another ECU in the form of a chip. The microcomputer may use existing CPU and memory while having a program added thereto. The microcomputer may be mounted directly onto the steering wheel, but may also be positioned in another portion of the vehicle.

The power supply to the steering wheel is made by connecting the + power-applying terminal and the − power-applying terminal, which are disposed on the steering wheel, to the heating element 20. Since the serially-arranged unit heating elements 10 are arranged in parallel between the + power-applying terminal and the − power-applying terminal, the resistance change of the unit heating elements 10 may be easily sensed by the microcomputer.

In this case, the microcomputer may periodically calculate the resistance of the heating element 20, such that if the resistance of the heating element 20 exceeds a predetermined value, the microcomputer may cut off the power, send the warning signal to the driver, or allow another safety measure to be taken.

In principle, the shape of the connection line 13 connecting the first unit line 11 with the second unit line 12 is not limited and may be various.

While the present disclosure has been particularly shown and described with reference to exemplary embodiments thereof, various changes in form and detail may be made therein without departing from the spirit and scope of the present disclosure as defined by the following claims. Accordingly, the substantial scope of the present disclosure will be defined by the appended claims and equivalents thereto.

I claim:

1. A steering wheel having a rim, comprising:
an electrically conductive heating element configured to coat a surface of the rim of the steering wheel, the heating element comprising a conductive ink or paint coated on the rim;
wherein the heating element comprises a plurality of unit heating elements arranged in parallel, each unit heating element comprising:
a first unit line, each of two ends of which connect a positive power-applying terminal and a negative power-applying terminal together in series;
a second unit line spaced apart from the first unit line, each of two ends of which connects the positive power-applying terminal and the negative power-applying terminal together in series;
wherein the first unit line and the second unit line are spaced apart from each other in a radial direction of the rim and are in parallel and have a radius of curvature that is the same as a radius of curvature of the rim;
wherein the plurality of unit heating elements are arranged spatially apart from each other in a radial direction of the rim and are not connected electrically to each other and connect the positive power-applying terminal and the negative power-applying terminal together in parallel; and
a plurality of connection lines for electrically connecting the first and second unit lines, a first of the plurality of connection lines comprising a plurality of first sub-connection lines that directly connects the first unit line and the second unit line in a diagonal direction and a plurality of second sub-connection lines and that directly connects the first unit line and the second unit line in a diagonal direction and intersects the first sub-connection line;
wherein the first of the plurality of connection lines is in an "x" shape by the first sub-connection line and the second sub-connection line and,
wherein each of the plurality of connection lines is arranged spatially apart from each other in a circumferential direction of the rim.

2. A fail-safety device for a steering wheel comprising:
the steering wheel having a rim coated with an electrically conductive heating element, the heating element comprising a conductive ink or paint coated on the rim, wherein the heating element comprises a plurality of unit heating elements arranged in parallel, each unit heating element comprising:
a first unit line, each of two ends of which connect a positive power-applying terminal and a negative power-applying terminal together in series;
a second unit line spaced apart from the first unit, each of two ends of which connects the positive power-applying terminal and the negative power-applying terminal together in series;
wherein the first unit line and the second unit line are spaced apart from each other in a radial direction of the rim and are in parallel and have a radius of curvature that is the same as a radius of curvature of the rim;
wherein the plurality of unit heating elements are arranged spatially apart from each other in a radial direction of the rim and are not connected electrically to each other and connect the positive power-applying terminal and the negative power-applying terminal together in parallel;
a plurality of connection lines for electrically connecting the first and second unit lines, a first of the plurality of the connection lines comprising a plurality of first sub-connection lines that directly connects the first unit line and the second unit line in a diagonal direction and a plurality of second sub-connection lines that directly connects the first unit line and the second unit line in a diagonal direction and intersects the first sub-connection line;
wherein the first of the plurality of connection lines is in an "x" shape by the first sub-connection line and the second sub-connection line and,
wherein each of the plurality of connection lines is arranged spatially apart from each other in a circumferential direction of the rim; and
a microcomputer for controlling power applied to the heating element and sensing a resistance of the heating element.

3. The fail-safety device for a steering wheel of claim 2, wherein the microcomputer is configured to cut off power applied to the heating element if the microcomputer senses that the resistance of the heating element exceeds a predetermined range due to damage of the heating element.

4. The fail-safety device for a steering wheel of claim 2, wherein the microcomputer is configured to transmit a warning signal to a driver if the microcomputer senses that the resistance of the heating element exceeds a predetermined range due to damage of the heating element.

\* \* \* \* \*